United States Patent [19]

Olson

[11] Patent Number: 5,265,752

[45] Date of Patent: Nov. 30, 1993

[54] FLANGE PROTECTOR HAVING INTEGRAL CONNECTORS

[75] Inventor: Donald C. Olson, Erie, Pa.

[73] Assignee: Alliance Plastics, Erie, Pa.

[21] Appl. No.: 17,435

[22] Filed: Feb. 12, 1993

Related U.S. Application Data

[63] Continuation of Ser. No. 765,815, Sep. 26, 1991, abandoned.

[51] Int. Cl.$^5$ .................. B65D 43/03; B65D 45/16; B65D 59/06; F16L 55/10

[52] U.S. Cl. ..................... 220/380; 138/89; 138/96 R; 220/324

[58] Field of Search ........... 24/453, 464, 487, 543; 138/89, 96 R, 96 T, 109; 220/324, DIG. 19, 380; 229/125.27; 285/121, 901, 921; 403/329, 348, 349; 206/508

[56] References Cited

U.S. PATENT DOCUMENTS

| | | | |
|---|---|---|---|
| 1,753,631 | 4/1930 | Walters | 285/901 |
| 2,579,354 | 12/1951 | Zelt | 229/125.27 |
| 3,526,935 | 9/1970 | Boyce | 24/487 |
| 3,677,434 | 7/1972 | Boyer | 220/324 |
| 3,856,050 | 12/1974 | Rooney . | |
| 3,942,681 | 3/1976 | Richardson | 138/96 R |
| 3,990,604 | 11/1976 | Bennett | 220/308 |
| 4,014,368 | 3/1977 | Nelsen . | |
| 4,094,436 | 6/1978 | Birmingham | 220/308 |
| 4,233,697 | 11/1980 | Cornwall . | |
| 4,348,875 | 9/1982 | Tsuru | 138/89 |
| 4,423,753 | 1/1984 | Smith et al. . | |
| 4,429,852 | 2/1984 | Tersteegen | 24/543 |
| 4,799,716 | 1/1989 | Kajawa | 138/89 |
| 4,850,773 | 7/1989 | Asami | 24/453 |
| 4,915,137 | 4/1990 | Hall et al. . | |
| 4,920,618 | 5/1990 | Iguchi | 24/453 |
| 5,199,139 | 4/1993 | Hutchinson | 24/464 |

Primary Examiner—James E. Bryant, III
Assistant Examiner—Terrence R. Till
Attorney, Agent, or Firm—Oliff & Berridge

[57] ABSTRACT

A flange disc for protecting a flange having an inner annular machined surface surrounded by an outer surface with bolt holes extending through the outer surface and opening to a back surface opposing the outer surface, includes: a disc of flexible material having a size corresponding to a size of the outer surface of the flange to selectively cover the inner surface, outer surface and bolt holes, the disc defining a disc plane; and a plurality of connectors symmetrically located about a periphery of the disc at locations corresponding to at least some of the bolt holes, the connectors being integral with the disc and having, at one end, a resilient hinge portion and, at an opposite end, an engagement portion for engaging the corresponding bolt hole, the connectors rotating about the hinge portion between a transport position in which the engagement portion is in the disc plane and an engagement position in which the engagement portion is angled with respect to the disc plane for engaging the bolt hole.

18 Claims, 2 Drawing Sheets

FLANGE PROTECTOR HAVING INTEGRAL CONNECTORS

This is a continuation of application Ser. No. 07/765,815 filed Sep. 26, 1991, now abandoned.

BACKGROUND OF THE INVENTION

1. Field of the Invention

This invention relates to a flange protector which may be installed and removed without tools. More particularly, the invention relates to a flange protector having flexible integral connection means for connecting the flange protector to the flange, the integral connection means having a transport position in which the connection means are in the plane of the protector to facilitate storage and transport, and an engagement position in which the connection means bend out of the plane of the protector to engage the flange. For installation, finger pressure on the connection means causes them to rotate about a flexible hinged portion and when pushed through bolt holes on a pipe flange, the connection means extends through the bolt hole and engages the back surface of the bolt hole. Light finger pressure between the flange protector and the flange machined surface can pry the connectors from their locked position to remove the flange protector.

2. Discussion of Related Art

Flange protectors are known in the art for covering and protecting a flange having an inner machined surface surrounded by an outer surface with bolt holes extending through the outer surface and opening to a back surface opposing the outer surface. For example, see U.S. Pat. Nos. 3,856,050; 4,014,368; 4,233,697; 4,423,753; and 4,915,137. While these patents disclose suitable flange protectors, they include a connector device which protrudes from the surface of the disc-shaped protector, thereby rendering transportation and storage of the disc cumbersome because of the protruding connectors. For example, the bulbs of U.S. Pat. No. 3,856,050, the thimbles of U.S. Pat. No. 4,014,368 (the disclosure of which is herein incorporated by reference) and tubular shanks of U.S. Pat. No. 4,423,753 all constantly protrude from the surface of the protector thus inhibiting stacking an requiring more space for storage and transportation. Further, U.S. Pat. No. 4,915,137 discloses a flange protector having hollow protrusions requiring fasteners to secure the flange protector to the flange. The fasteners are not integral with the protector.

SUMMARY OF THE INVENTION

It is thus an object of the invention to provide a flange protector which simplifies stacking, storage and transport by including connection means which are integral with the flange protector and lie within the plane of the protector during transport but bend away from the plane of the protector for attaching the flange protector to the flange.

To achieve this and other objects and advantages, the inventive flange disc for protecting a flange having an inner annular machined surface surrounded by an outer surface with bolt holes extending through the outer surface and opening to a back surface opposing the outer surface, comprises:

a disc of flexible material having a size corresponding to a size of the outer surface of the flange to selectively cover the inner surface, outer surface and bolt holes, the disc defining a disc plane; and at least one connective means for selectively connecting the disc to the flange, the at least one connective means being integral with the disc and located in a position corresponding to at least one bolt hole, the connective means being resiliently movable between a transport position in the disc plane and an engagement position angled with respect to the disc plane for engaging the at least one bolt hole to secure the disc to the flange.

In a preferred embodiment, a plurality of connectors are symmetrically located about a periphery of the disc at locations corresponding to at least some of the bolt holes, the connectors being integral with the disc and having, at one end, a resilient hinge portion and at an opposite end an engagement portion for engaging the corresponding bolt hole, the connectors rotating about the hinge portion between a transport position in which the engagement portion is in the disc plane and an engagement position in which the engagement portion is angled with respect to the disc plane for engaging the bolt hole.

BRIEF DESCRIPTION OF THE DRAWINGS

These and other objects and advantages of the invention will become apparent from the following detailed description of the preferred embodiments taken in conjunction with the following figures wherein.

DETAILED DESCRIPTION OF THE PREFERRED EMBODIMENTS

Figure 3:
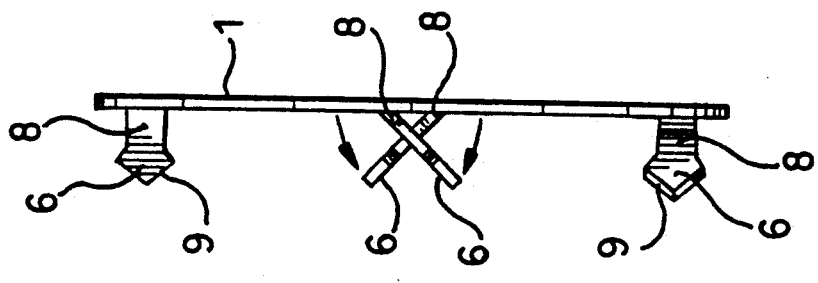
FIG. 3 is a side view of the disc in the disc plane with the connectors partially rotated about the hinge axis.
Figure 2:
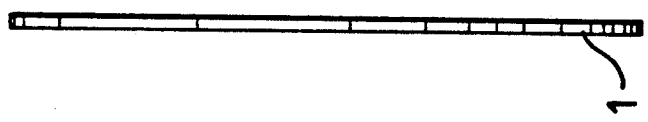
FIG. 2 is a side view of the disc in the disc plane with the connectors in the transport position.
Figure 1:
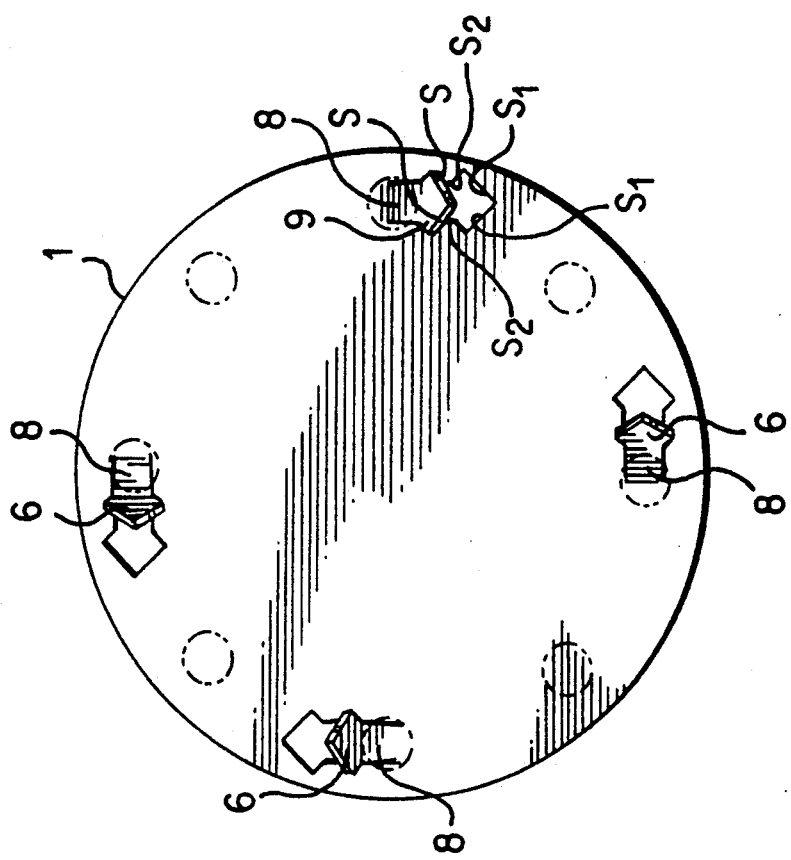
FIG. 1 is a plan view of a non-engaged flange protector disc superimposed over a flange with the bolt holes illustrated in phantom.
Figure 5:
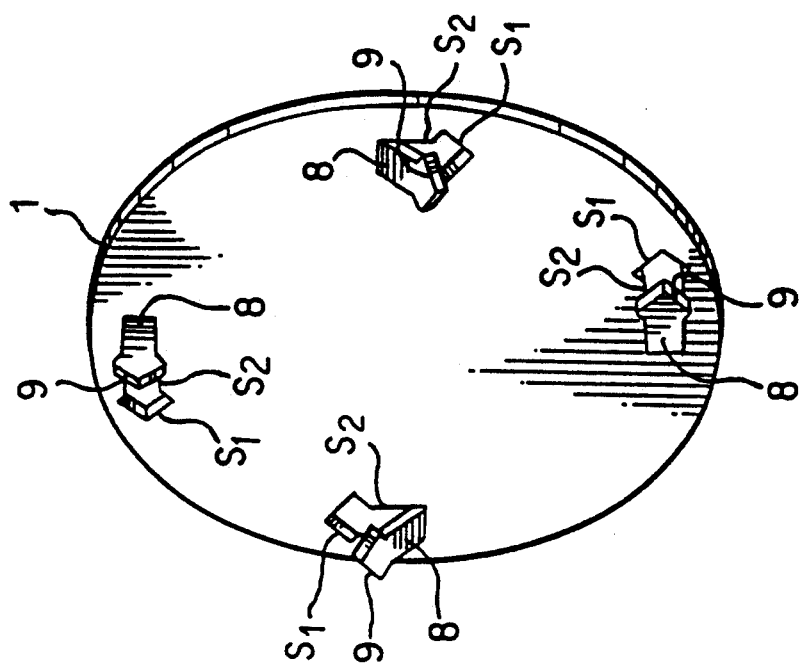
FIG. 5 is a perspective view of the disc with the connectors protruding from the disc plane.
Figure 4:
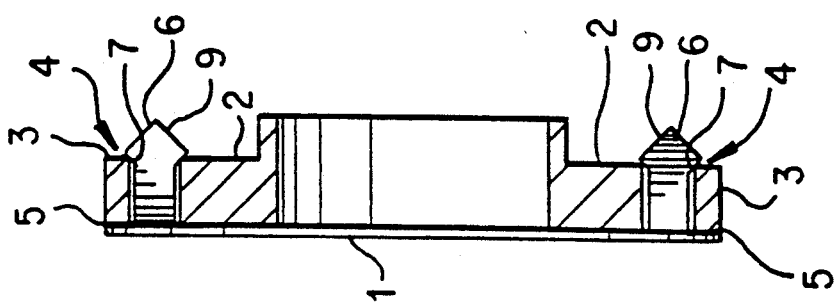
FIG. 4 is a sectional view of the disc flush against the machined surface of the flange and the connectors engaging the back surface of the flange bolt holes.

FIG. 4 shows a flange protector 1 used for protecting flanges used in making connections to pipes, valves and the like. Such flanges are made to Army, Navy and ASA standards and are characterized by a hub 2 which may be connected to or integral with a pipe or valve, a flange 3 integral with the hub 2 and having bolt holes 4 for bolting the flange 3 to a mating flange to make a fluid tight connection, and a machined gasket surface 5 on the sealing face of the flange against which a gasket is compressed when the flanges are bolted together. The machined surface enters critically into the seal. Rough or irregular surfaces require greater deformation of the gasket and therefore greater bolt pressure to effect a seal. Scratches, dents or nicks may cause leakage. It is therefore essential that the machined surface 5 be protected until the flange is ready for use. It is also desirable that the protector be easily installed and removed, without requiring tools.

Known flange protector designs, although they do not require tools for installation, are either bulky and cumbersome to ship or require packing separately the auxiliary flange protector components (such as the fasteners of U.S. Pat. No. 4,915,137). The invention provides a single piece flange protector which retains the simple installation features of previous flange protector designs but incorporates novel characteristics which eliminate the undesirable bulk and auxiliary fastening components.

The flange protector is a single disc 1, constructed from a plastic, flexible material with high resiliency such as polyethylene which is impact resistant. The disc 1 is cut or punched from a sheet to form the disc having a diameter sufficient to cover the entire flange including the machined surface 5, bolt holes 4, hub 2 and internal port of the pipe. The disc 1 has at least one connector 6, cut-out from the disc preferably by punching (and preferably at the same time that the disc 1 is cut from the sheet). In a preferred embodiment, four connectors 6 are symmetrically provided on the perimeter of the disc, each having a position corresponding to a bolt hole on the flange. Each connector 6 is formed by at least two slits S which intersect at one end of the connector 6 to form an engagement portion 9 for engaging the bolt hole. The slits do not intersect at the opposite end of the connector, thus forming a hinge portion 8 about which the engagement portion 9 can pivot or rotate. In the preferred embodiment, the connectors 6 are formed of several slits which define an arrow shape. More specifically, the arrow of the connector is defined by two intersecting slits S forming the tip of the arrow, two arrowhead forming slits $S_1$, and two parallel arrow shank slits $S_2$ which end at the hinge portion 8 of the connector. Other shapes, however, are possible such as a "T" shape. In a most preferred embodiment, the shape of the engagement portion 9 is larger than the inner diameter of the bolt hole and the length of the connector between the hinge portion and the engagement portion is larger than the depth of the bolt hole. This structure permits the engagement portion 8 to have a locking surface 7 (defined by the slit $S_1$) which engages the back surface of the flange to hold the flange protector in position against the flange. The elasticity of the flange protector material permits bending of the engagement portion 9 when inserting the locking surface 7 through the bolt hole. This elasticity permits the locking surface 7 to elastically resume its position when pushed through the bolt hole, so that the locking surface 7 now engages the back surface of the flange. Further, the elasticity of the connectors urges them to return to the disc plane, and thus pulls the disc toward the flange to hold the disc against the flange to protect the flange. Accordingly, the elasticity of the connectors causes them to automatically retract toward the disc plane when the locking surface is released from engagement with the back surface of the flange.

In operation, the connectors of the flange protector disc 1 initially reside in the same plane, the disc plane, when manufactured and remain as such until installed. This simplifies stacking, storage and transport since the disc is flat. When installed, the engagement portion of the connector, positioned to align with a bolt hole, is bent out of the disc plane and pushed through the bolt hole, and having a length sufficient to pass through the bolt hole, engages the back surface of the flange with the locking surface 7 of the connector 6, to hold the flange protector firmly against the machined surface of the flange 3. The connectors are easily inserted into the bolt holes 4 by finger pressure on the ends opposite the hinged axis thereby pressing the connectors out of the disc plane and into position for engaging the bolt holes. To remove the disc, the locking surfaces 7 are released and passed back through the bolt holes.

The flange protector is specifically adapted to punching or die cutting. In the die cutting process, the protector of appropriate diameter is cut simultaneously with the connectors which are formed by cutting the flange protector material in a layout corresponding to the appropriate length and width of the connector, sized for the specific bolt holes, while leaving the hinged side of the connector uncut and intact.

The installation and removal of the flange protector requires no tools and very little time and effort.

The particular flange illustrated is one of the common flanges which has a flush machined gasket surface. This concentrates the forces of the bolts directly on the gasket surface. Gasket surfaces have other configurations. The flange protector is not limited to use with flanges with flush surfaces but may be used with other flanges which have gasket surfaces in different planes and which have bolt holes registering and making a locking fit with the connectors.

The terms storage, transport, engaging, inner, outer, etc. have been used to describe the relative positions of the parts in the position illustrated in the drawings and are not terms of limitation. Further, the invention has been described with reference to its preferred embodiments, which are intended to be illustrative and not limiting. For example, the invention has been described with reference to arrow-shaped connectors and T-shaped connectors, but other shapes are possible, particularly if they can provide the locking surface described herein. Thus variations and changes may be made without departing from the spirit and scope of the invention as defined in the following claims.

I claim:

1. A flange disc for protecting a flange having an inner annular machined surface surrounded by an outer surface with bolt holes extending through the outer surface and opening to a back surface opposing the outer surface, the flange disc comprising:
    a disc of flexible material having a size corresponding to a size of the outer surface of the flange to selectively cover the inner surface, outer surface and bolt holes, the disc defining a disc plane; and
    at least one connective means for selectively connecting the disc to the flange, the at least one connective means being integral with the disc and located in a position corresponding to the at least one bolt hole, the at least one connective means comprising a hinge member for moving the at least one connective means between a substantially flat transport position in the disc plane and a locking position angled with respect to the disc plane to lock the disc to the flange by engaging the at least one bolt hole, the hinge member being resilient and providing a means for automatically retracting the at least one connective means from the locking position toward the transport position when the at least one connective means is released from the locking position.

2. The flange disc of claim 1 wherein the disc has a plurality of connective means located in positions corresponding to at least some of the bolt holes.

3. The flange disc of claim 2 wherein the plurality of connective means are symmetrically located about the disc.

4. The flange disc of claim 1, wherein the at least one connective means has the hinge portion at one end and an engagement portion at an opposite end, the at least one connective means rotating about the hinge member to assume the transport and locking positions.

5. The flange disc of claim 4, wherein a length of the connective means between the hinge member and the engagement portion corresponds to a depth of the bolt hole.

6. The flange disc of claim 4, wherein the engagement portion engaging the bolt hole includes a locking surface for engaging the back surface of the flange.

7. The flange disc of claim 4, wherein the engagement portion has a size larger than a diameter of the at least one bolt hole for locking against the back surface of the flange.

8. The flange disc of claim 1, wherein the at least one connective means in the locking position urges the disc against the flange.

9. A flange disc for protecting a flange having an inner annular machined surface surrounded by an outer surface with bolt holes extending through the outer surface and opening to a back surface opposing the outer surface, the flange disc comprising:
   a disc of flexible material having a size corresponding to a size of the outer surface of the flange to selectively cover the inner surface, outer surface and bolt holes, the disc defining a disc plane; and
   at least one connector integral with the disc and located at a position corresponding to at least one bolt hole, the at least one connector being defined by at least two slits in the disc defining one end of the connector rotatable about an opposite end of the connector, the at least one connector assuming one of a substantially flat transport position in which the one end of the connector is in the disc plane and a locking position in which the one end of the connector is angled with respect to the disc plane to lock the disc to the flange by engaging the corresponding bolt hole, the opposite end of the connector being resilient and providing a means for automatically retracting the connector from the locking position toward the transport position when the one end of the connector is released from the locking position.

10. The flange disc of claim 9, wherein the at least two slits define an engagement portion for the connector, the engagement portion having a size larger than an inner diameter of the bolt hole.

11. The flange disc of claim 9, wherein the at least two slits define an engagement portion for the connector having a locking surface for locking against the back surface of the flange.

12. The flange disc of claim 9, wherein a length of the connector between the one end of the connector and the opposite end of the connector corresponds to a depth of the bolt hole.

13. The flange disc of claim 9, wherein the at least one connector is the locking position urges the disc against the flange.

14. A flange disc for protecting a flange having an inner annular machined surface surrounded by an outer surface with bolt holes extending through the outer surface and opening to a back surface opposing the outer surface, the flange disc comprising:
   a disc of flexible material having a size corresponding to a size of the outer surface of the flange to selectively cover the inner surface, outer surface and bolt holes, the disc defining a disc plane; and
   a plurality of connectors located about a periphery of the disc at locations corresponding to at least some of the bolt holes, the connectors being integral with the disc and having, at one end, a resilient hinge portion and, at an opposite end, an engagement portion for engaging the corresponding bolt hole, the connectors rotating about the hinge portion between a substantially flat transport position in which the engagement portion is in the disc plane and a locking position in which the engagement portion is angled with respect to the disc plane for engaging the bolt hole, the hinge portion being resilient and providing a means for automatically retracting the engagement portion from the locking position toward the transport position when the locking portion is released from the engagement position.

15. The flange disc of claim 14, wherein the engagement portion has a size larger than an inner diameter of the bolt hole.

16. The flange disc of claim 14, wherein the engagement portion has a locking surface for locking against the back surface of the flange.

17. The flange disc of claim 14, wherein a length of the connector between the hinge and engagement portions corresponds to a depth of the bolt hole.

18. The flange disc of claim 14, wherein the plurality of connectors in the locking position urge the disc against the flange.

* * * * *